United States Patent [19]
Ikeda et al.

[11] Patent Number: 5,634,348
[45] Date of Patent: Jun. 3, 1997

[54] AIR CONDITIONER FOR VEHICLES

[75] Inventors: Susumu Ikeda; Toshimi Isobe; Atsuo Inoue, all of Isesaki; Toshihiko Fujita, Sawa-gun; Akihiro Tajiri, Wako; Mitsuru Ishikawa, Wako; Choji Sakuma, Wako; Nobuyuki Yuri, Wako, all of Japan

[73] Assignee: Honda Giken Kogyo Kabushiki Kaisha, Tokyo, Japan

[21] Appl. No.: 480,248

[22] Filed: Jun. 7, 1995

[30] Foreign Application Priority Data

Jul. 6, 1994 [JP] Japan .................... 6-155028

[51] Int. Cl.$^6$ .................... F25B 30/00
[52] U.S. Cl. .................... 62/160; 62/173; 62/180; 62/229
[58] Field of Search .................... 62/229, 228.4, 62/228.5, 180, 226, 227, 173, 181, 183, 184; 236/13, 91 F

[56] References Cited

U.S. PATENT DOCUMENTS

5,305,613 4/1994 Hotta et al. .................... 62/231 X
5,419,149 5/1995 Hara et al. .................... 62/160

*Primary Examiner*—Harry B. Tanner
*Attorney, Agent, or Firm*—Lyon & Lyon LLP

[57] ABSTRACT

An air conditioner for vehicles includes a refrigerant circuit having a compressor capable of varying its output, a heat sink and a radiator disposed in an air duct for cooling operation, heating operation and dehumidifying operation modes; sensors for detecting air temperatures at the output-side positions of the heat sink and the radiator, respectively; and a control unit for controlling the output of the compressor in response to at least one of the detected air temperatures. The heat absorbing action due to the heat sink and the heat radiating action due to the radiator are appropriately controlled in the refrigerant circuit side in the respective operation modes without unnecessary heat absorbing and heat radiating actions. Further, the temperature of the air discharged from the air duct into the interior of the vehicle can be properly controlled by adjustment of the heat absorbing ability of the heat sink and the heat radiating ability of the radiator by the control of the compressor output.

12 Claims, 6 Drawing Sheets

AIR CONDITIONER FOR VEHICLES

BACKGROUND OF THE INVENTION

1. Field of the Invention

The present invention relates to an air conditioner for a vehicle which heats, cools or dehumidifies the interior of the vehicle.

2. Description of the Related Art

In such a conventional air conditioner, the air conditioner generally has a heat sink or absorber provided at an upstream position in an air duct, a radiator provided at a downstream position in the air duct and an air mixing damper provided between the heat sink and the radiator for changing the volume of the air passing through the radiator. The heat sink displays a heat absorbing action and the radiator displays a heat radiating action. The heat provided to the air having passed through the heat sink is controlled by the opening degree of the air mixing damper, thereby controlling cooling, heating and dehumidifying operations.

In such a conventional air conditioner, because the air mixing damper is merely controlled at an opening degree predetermined in correspondence to a preset temperature etc., it is difficult to adequately control the temperature of the air actually discharged from the air duct into the interior of the vehicle. Further, in the cooling or heating operation mainly utilizing one of heat absorbing and heat radiating actions, there is a problem that energy of the other heat radiating or absorbing action is likely to be wasted inefficiently.

SUMMARY OF THE INVENTION

It is an object of the present invention to provide an air conditioner for a vehicle which can adequately control the temperature of the air discharged into the interior of the vehicle and which can efficiently perform the cooling, heating and dehumidifying operations.

To accomplish the above object, an air conditioner for vehicles according to the present invention comprises a heat pump refrigerant circuit having a compressor capable of varying its output, a heat sink provided at an upstream position in an air duct for performing a heat absorbing action and a radiator provided at a downstream position in the air duct for performing a heat radiating action. The refrigerant circuit serves to provide a cooling operation utilizing the heat absorbing action, a heating operation utilizing mainly the heat radiating action and a dehumidifying operation utilizing both the heat absorbing action and the heat radiating action. The air conditioner further comprises means for detecting air temperatures at output-side positions of the heat sink and the radiator, respectively, and means for controlling the output of the compressor in response to at least one of either the air temperature detected at an output-side position of the heat sink or the air temperature detected at an output-side position of the radiator.

In the air conditioner, the cooling operation is performed utilizing the heat absorbing action displayed by the heat sink of the refrigerant circuit, the heating operation is performed by utilizing the heat radiating action performed by the radiator or both the heat radiating action and the heat absorbing action performed by the heat sink, and the dehumidifying operation is performed by utilizing both the heat absorbing action performed by the heat sink and the heat radiating action performed by the radiator. Namely, unnecessary heat absorbing action and heat radiating action by the heat sink and the radiator can be prevented by controlling (restricting) the heat absorbing action due to the heat sink and the heat radiating action due to the radiator in the refrigerant circuit depending upon the respective operation modes, thereby preventing a waste of the heat absorbing and heat radiating energy and realizing an adequate operation while saving energy. Further, since the output of the compressor is controlled in response to at least one of either the air temperature detected at an output-side position of the heat sink or the air temperature detected at an output-side position of the radiator, it becomes possible to adjust the heat absorbing and heat radiating abilities based on the control of the compressor output, thereby controlling the temperature of the air discharged from the air duct into the interior of the vehicle properly and precisely while realizing a proper control of the temperature for air conditioning.

In the air conditioner, means for controlling the volume of air passing through the radiator is provided, for example, an air mixing damper is provided immediately upstream of the radiator. The air volume control means is controlled so that the volume of air passing through the radiator becomes minimum at the time of the cooling operation, and the compressor output control means is controlled so that the air temperature detected at the output-side position of the heat sink is controlled to a target discharge temperature.

In such a control system, since the volume of air passing through the radiator which is not necessary for the cooling operation is controlled to a minimum value, even if a residual heat remains in the radiator at the time of switching from the heating operation to the cooling operation, deterioration of the cooling effect by the residual heat in the radiator is minimized. Moreover, since the output of the compressor is controlled such that the air temperature detected at the output-side position of the heat sink becomes the target discharge temperature, by adjustment of the heat absorbing ability of the heat sink based on the control of the compressor Output, a desired cooling operation can be performed with a saving of energy and a high efficiency as well as the temperature of the air discharged from the air duct into the interior of the vehicle can be controlled properly and adequately.

Further, the air volume control means is controlled so that the volume of air passing through the radiator becomes maximum at the time of the heating operation, and the compressor output control means is controlled so that the air temperature detected at the output-side position of the radiator is controlled to a target discharge temperature.

In such a control system, since the volume of air passing through the radiator which is mainly heat exchanged in the heating operation is controlled to a maximum value and the compressor output is controlled so that the air temperature detected at the output-side position of the radiator becomes the target discharge temperature, the radiator can radiate the required heat precisely by the control of the compressor output, and a desired heating operation can be performed with a saving of energy and a high efficiency as well as the temperature of the air discharged from the air duct into the interior of the vehicle can be controlled properly and adequately. Moreover, because the air temperature at the output-side position of the radiator is the temperature of the air discharged from the air duct into the interior of the vehicle, even if there are a plurality of outlet ports, the temperature of the air discharged from each outlet port can be maintained uniform.

Furthermore, the air volume control means is controlled so that the volume of air passing through the radiator is controlled to an air volume determined based on a ratio of the air temperature detected at the output-side position of the radiator to a target discharge temperature at the time of the dehumidifying operation, and the compressor output control means is controlled so that the air temperature detected at the output-side position of the heat sink is controlled to a target dehumidification temperature.

In such a control system, since the volume of air passing through the radiator is decided based on the ratio of the air temperature detected at the output-side position of the radiator to a target discharge temperature at the time of the dehumidifying operation, the volume of air passing through the radiator relative to the target discharge temperature can be adequately controlled, thereby controlling the temperature of the air discharged from the air duct into the interior of the vehicle properly and adequately in the dehumidifying operation.

Moreover, because the compressor output is controlled so that the air temperature at the output-side position of the heat sink becomes the target dehumidification temperature, the amount of dehumidification in the dehumidifying operation can be appropriately controlled by adjustment of the heat absorbing ability of the heat sink, thereby realizing a desired dehumidifying operation with a saving of energy and a high efficiency.

Further objects, features, and advantages of the present invention will be understood from the detailed description of the preferred embodiment of the present invention with reference to the appropriate figures.

BRIEF DESCRIPTION OF THE DRAWINGS

A preferred exemplary embodiment of the invention will now be described with reference to the appropriate figures, which is given by way of example only, and is not intended to limit the present invention.

DETAILED DESCRIPTION OF THE PREFERRED EMBODIMENT

Figure 1:
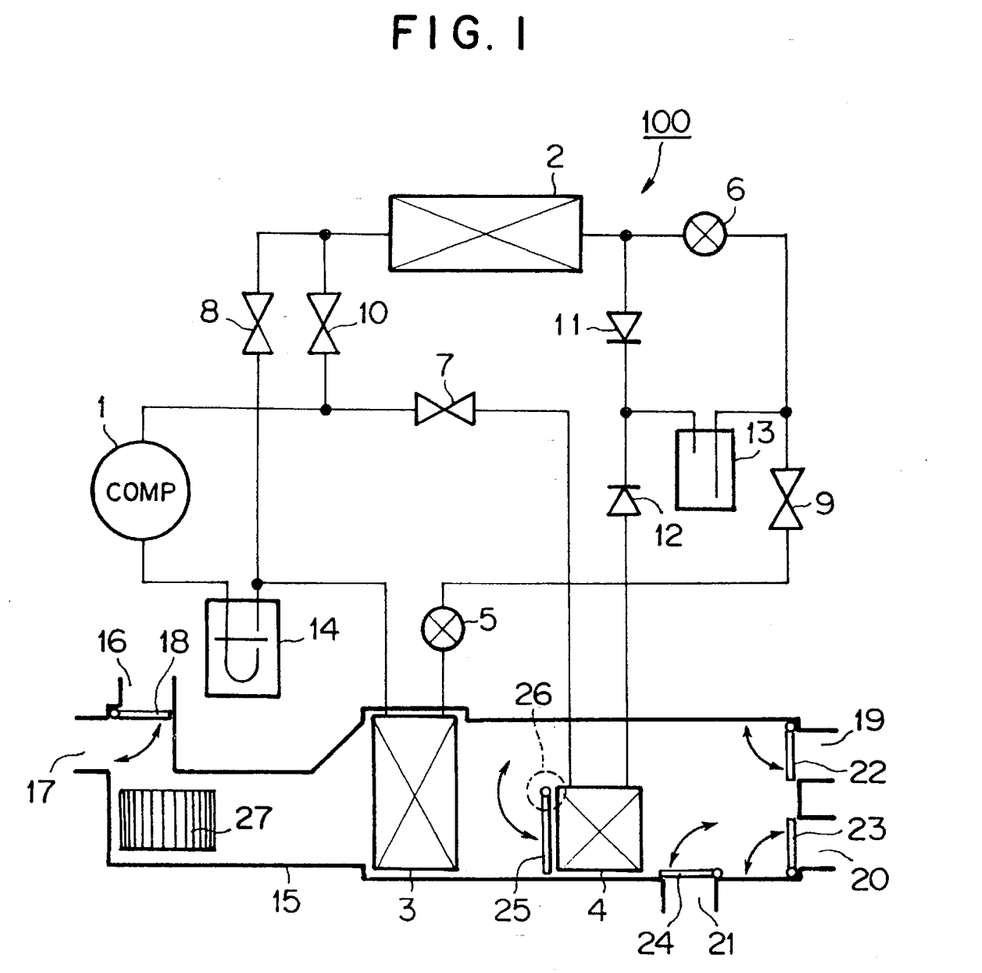
FIG. 1 is a schematic view of an air conditioner for vehicles according to a preferred embodiment of the present invention.
Figure 2:
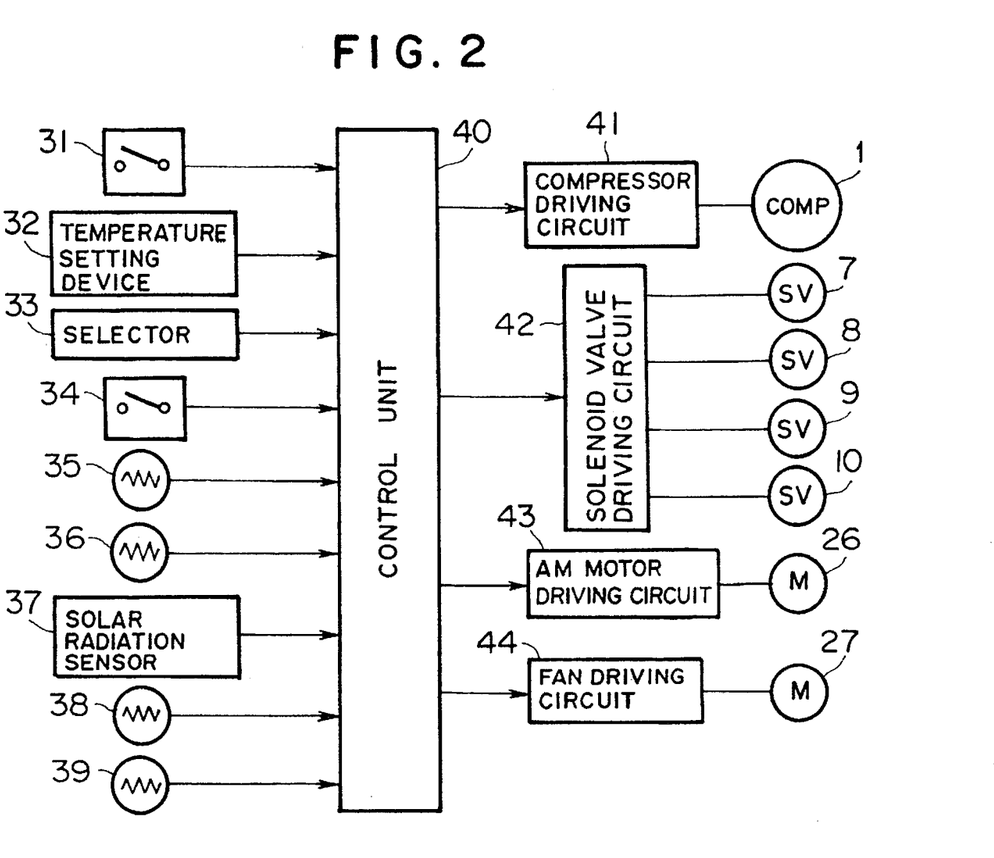
FIG. 2 is a block diagram for control of the air conditioner shown in FIG. 1.
Figure 3:
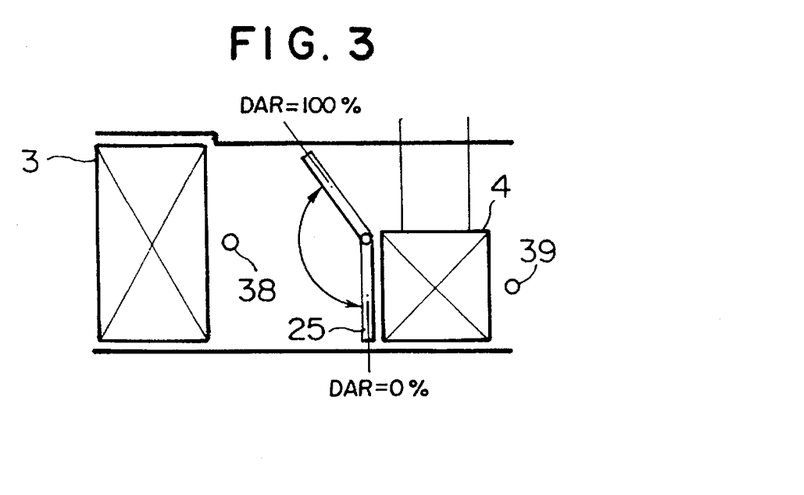
FIG. 3 is an enlarged schematic view of a part of the air conditioner shown in FIG. 1, showing the range of the opening degree of an air mixing damper.

Referring to FIGS. 1 to 3, an air conditioner 100 for a vehicle according to a preferred embodiment of the present invention has a variable displacement motor compressor 1, an external heat exchanger 2 provided outside of a duct 15 through which the air for air conditioning is sent to an interior of the vehicle, and a first internal heat exchanger 3 and a second internal heat exchanger 4 provided inside of the duct 15.

The discharge port of compressor 1 is connected to one port of the external heat exchanger 2 via a fourth solenoid valve 10, and the other port of the external heat exchanger 2 is connected to the inlet of a receiver 13 via a first check valve 11. The outlet of receiver 13 is connected to one port of a first internal heat exchanger 3 via a third solenoid valve 9 and a first expansion valve 5 comprising a thermosensitive type valve. The other port of the first internal heat exchanger 3 is connected to the inlet of an accumulator 14, and the outlet of the accumulator 14 is connected to the suction port of compressor 1.

Further, the discharge port of compressor 1 is connected to one port of a second internal heat exchanger 4 via a first solenoid valve 7, and the other port of the second internal heat exchanger 4 is connected to the inlet of receiver 13 via a second check valve 12. A second expansion valve 6 comprising a thermosensitive type valve is provided between the outlet of receiver 13 and the other port of external heat exchanger 2. A second solenoid valve 8 is provided between one port of external heat exchanger 2 and the inlet of accumulator 14.

Duct 15 has an outside-air inlet port 16 and an inside-air inlet port 17. The balance between outside air and inside air to be drawn into the duct 15 is adjusted by a switching damper 18. A motor fan 27 is provided in duct 15 for discharging the air to the interior of the vehicle. In duct 15, the first internal heat exchanger 3 is disposed at an upstream position as a heat sink performing a heat absorbing action, and the second internal heat exchanger 4 is disposed at a downstream position as a radiator performing a heat radiating action. An air mixing damper 25 is provided immediately upstream of the second internal heat exchanger 4, and is driven by a motor 26 for the air mixing damper 25 (hereinafter, referred to as "AM motor"). The discharge ports of duct 15 comprise a vent port 19, a foot port 20 and a defroster port 21. A damper 22 opens and closes vent port 19, a damper 23 opens and closes foot port 20 and a damper 24 opens and closes defroster port 21.

FIG. 2 shows a control circuit for the above-described air conditioner 100 and FIG. 3 shows the location of temperature sensors and the opening degree of air mixing damper 25. An air conditioner switch 31, a conditioning temperature setting device 32, a selector 33 for selecting an air supplying mode and a dry switch 34 are connected to a control unit 40 (such as a microcomputer). Air conditioner switch 31 initiates the operation of the air conditioning. Conditioning temperature setting device 32 has a lever or buttons for setting an air temperature to be controlled, and the temperature for air conditioning can be appropriately selected and set by the operation of the conditioning temperature setting device 32. Selector 33 for selecting an air supplying mode has a variable lever capable of changing the volume of air and capable of selecting an "OFF" position and an "AUTO" position (automatic control mode). The air volume can be changed in multiple stages or continuously by the operation of the variable lever, and the air volume can be automatically controlled by control unit 40 when the lever is switched to the position of "AUTO".

The signals from a temperature sensor 35 (for example, a thermister) for detecting the temperature of inside air, a temperature sensor 36 (for example, a thermister) for detecting the temperature of outside air, a solar radiation sensor 37 (for example, a photosensor), a first air temperature sensor 38 (for example, a thermister) for detecting air temperature at an output-side position (FIG. 3) of the first internal heat exchanger 3 (heat sink) and a second air temperature sensor 39 (for example, a thermister) for detecting air temperature (MIX·S) at an output-side position (FIG. 3) of the second internal heat exchanger 4 (radiator) are supplied to control unit 40.

Control unit 40 has a CPU, ROMs, RAMs, etc., and programs for the determination of modes, the control of the rotational speed of compressor 1 and the control of switching conditions of the solenoid valves as well as a program for the control of the opening degree of air mixing damper 25 described later are stored in the ROMs. This control unit 40 sends control signals to a compressor driving circuit 41, a solenoid valve driving circuit 42, an AM motor driving circuit 43 and a fan driving circuit 44, respectively, in response to the operational signals of air conditioner switch 31, conditioning temperature setting device 32, selector 33 and dry switch 34, and the detected signals of inside-air temperature sensor 35, outside-air temperature sensor 36, solar radiation sensor 37 and the first and second air temperature sensors 38 and 39.

Compressor driving circuit 41 controls the rotational speed of compressor 1 in response to the rotational-speed signal sent from control unit 40. Solenoid valve driving circuit 42 controls the opening and closing operations of the respective solenoid valves 7 to 10 in response to the mode signals sent from control unit 40 for switching the refrigerant cycle in the refrigerant circuit. AM motor driving circuit 43 controls the electric power applied to AM motor 26 in response to the opening-degree signal sent from control unit 40 for driving the air mixing damper 25 between a "0%" position and a "100%" position shown in FIG. 3 whereby the opening degree of the damper 25 is controlled. Fan driving circuit 44 controls the electric power applied to motor fan 27 and thereby controls the volume of air supplied by motor fan 27 in response to the air volume signal sent from control unit 40.

In the above-described air conditioner, four operation modes of cooling, dry cooling, heating and dry heating are possible, and the respective operation modes are automatically determined by control unit 40 based on the respective detecting signals and operational signals.

The control of the opening degree of air mixing damper 25 in each operation mode will be explained hereinafter together with the operation of the circuit.

Figure 4:
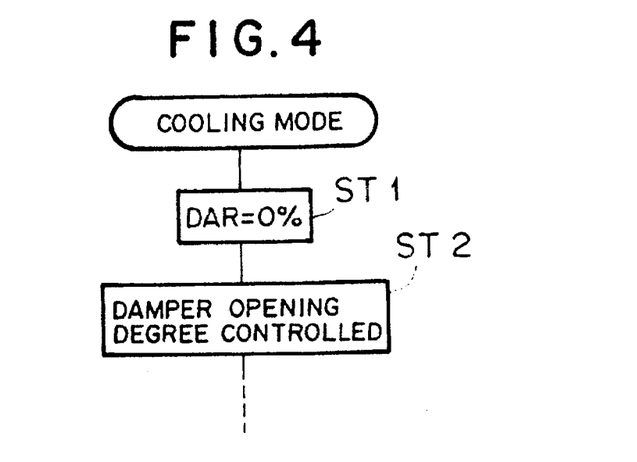
FIG. 4 is a flowchart showing the control of the opening degree of the air mixing damper during a cooling-operation mode.

When the mode is determined to be cooling mode, as shown in FIG. 4, the opening degree DAR of damper 25 is set to 0% (step ST1). A signal corresponding the opening degree is sent to AM motor driving circuit 43 and the opening degree of air mixing damper 25 is controlled to 0% (step ST2).

Figure 5:
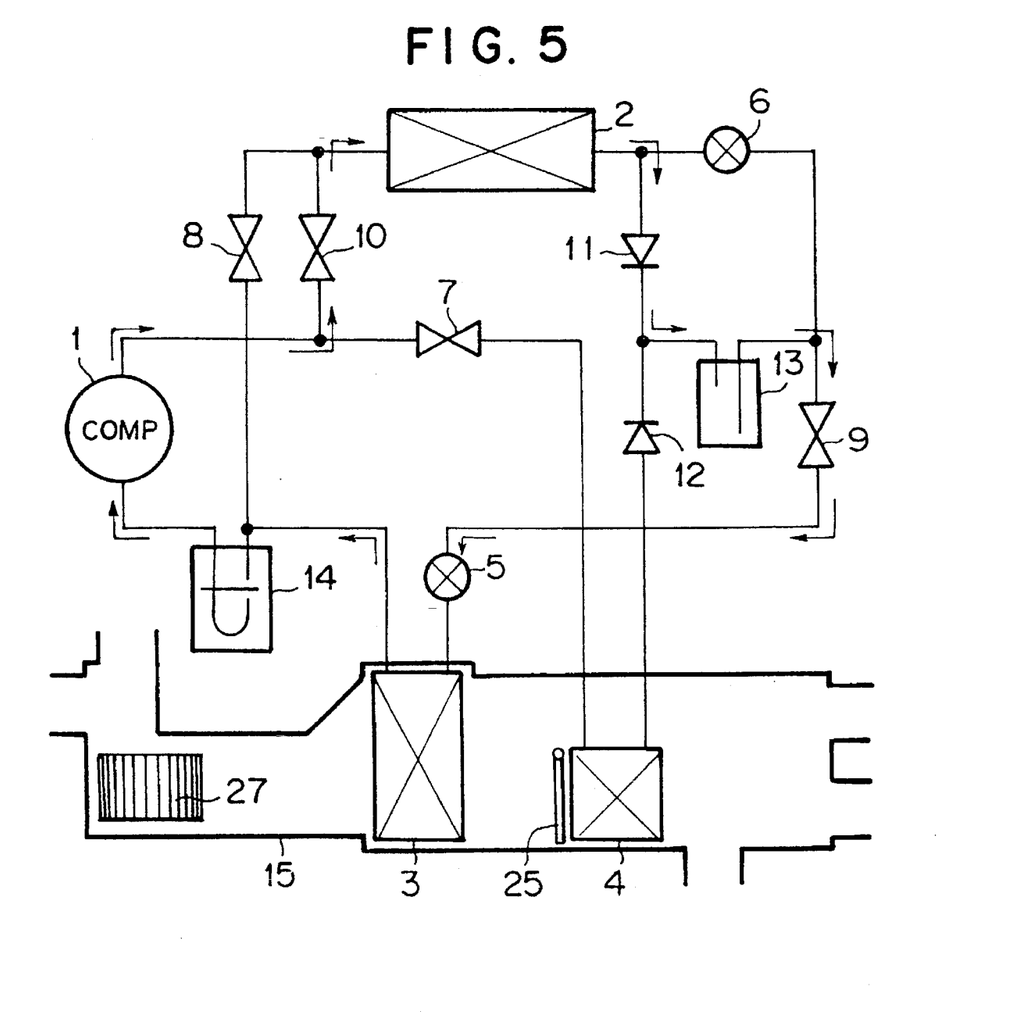
FIG. 5 is a schematic diagram of a refrigerant circuit during the cooling-operation mode of the air conditioner shown in FIG. 1.

In this operation of the cooling mode, the first and second solenoid valves 7 and 8 are closed and the third and fourth solenoid valves 9 and 10 are opened, and compressor 1 and motor fan 27 are driven. As shown in FIG. 5, the refrigerant discharged from compressor 1 flows to external heat exchanger 2 through the fourth solenoid valve 10 and is condensed therein. The condensed refrigerant then flows to the first expansion valve 5 and the first internal heat exchanger 3 through the first check valve 11, receiver 13 and the third solenoid valve 9 and is evaporated therein. The evaporated refrigerant is sent to accumulator 14 and thereafter drawn into compressor 1. The air drawn into duct 15 by the operation of motor fan 27 bypasses the second internal heat exchanger 4 after passing through the first internal heat exchanger 3, and thereafter, the air is supplied to the predetermined discharge ports.

In this cooling mode, the cooling of the interior of the vehicle can be performed utilizing the heat absorbing action of the refrigerant performed by the first internal heat exchanger 3. In the operation of this cooling mode, the output of compressor 1 is controlled so that the air temperature detected at the output-side position of the first internal heat exchanger 3 becomes the target temperature "TAO" of discharge air.

Figure 6:
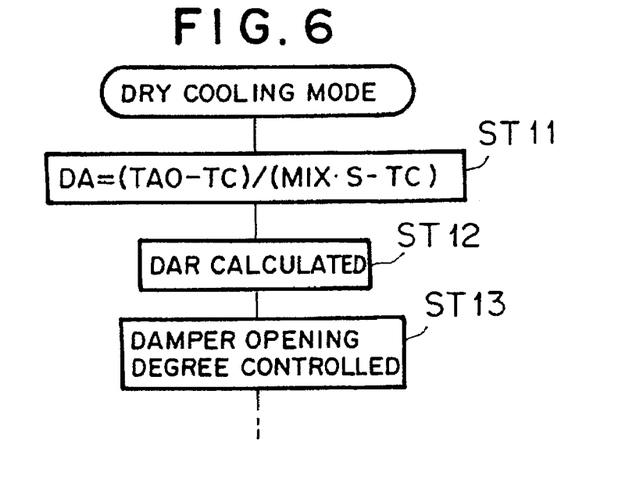
FIG. 6 is a flowchart showing the control of the opening degree of the air mixing damper during a dry cooling-operation mode.

When the mode is determined to be the dry cooling mode, as shown in FIG. 6, firstly a basic opening degree DA of damper 25 is calculated by the equation: $DA=(TAO-TC)/(MIX \cdot S-TC)$ at step ST11. In the equation, "MIX. S" represents an air temperature detected at the output-side position of the second internal heat exchanger 4, "TC" represents a predetermined temperature correction factor, and "TAO" is a target temperature of discharge air calculated by the equation:

$$TAO = Ks \cdot Ts - Kr \cdot Tr - Kam \cdot Tam - Krad \cdot Trad + C.$$

In the above equation, "Ts" represents a temperature set by a user, "Tr" represents a temperature of the inside air, "Tam" represents a temperature of the outside air, "Trad" represents a value converted into a temperature value from an amount of solar radiation, "Ks" represents a set temperature factor, "Kr" represents an inside-air temperature factor, "Kam" represents an outside-air temperature factor, "Krad" represents a solar radiation factor and "C" represents a correction factor. These factors are selected as appropriate substantive values depending upon the size of the interior space, etc.

An actual opening degree DAR is calculated from the determined basic opening degree DA (step ST12). After calculation of the opening degree DAR, a signal corresponding to the opening degree is sent to AM motor driving circuit 43, and the opening degree of air mixing damper 25 is controlled (step ST13).

Figure 7:
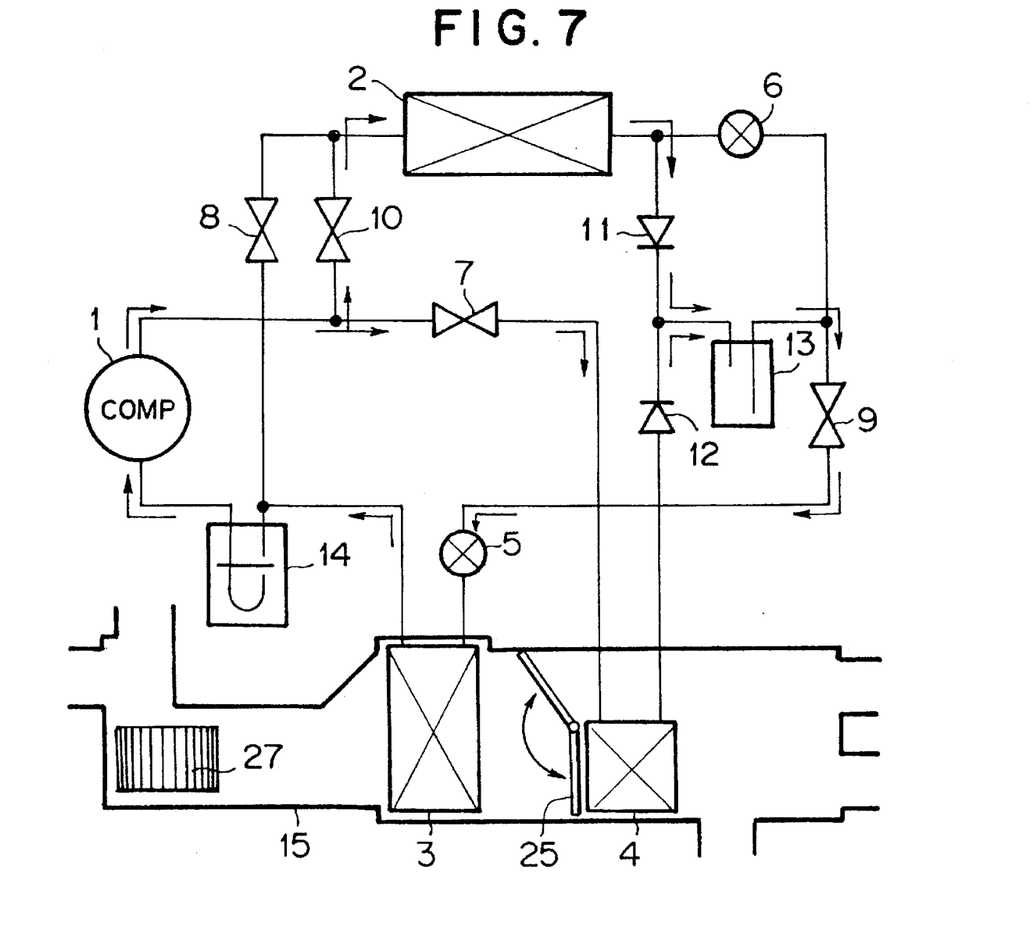
FIG. 7 is a schematic diagram of a refrigerant circuit during the dry cooling-operation mode of the air conditioner shown in FIG. 1.

In the operation of this dry cooling mode, the first, third and fourth solenoid valves 7, 9 and 10 are opened and the second solenoid valve 8 is closed, and in such a condition, compressor 1 and motor fan 27 are driven. As shown in FIG. 7, a part of the refrigerant discharged from compressor 1 flows to external heat exchanger 2 through the fourth solenoid valve 10 and is condensed therein. The condensed refrigerant flows to the first expansion valve 5 and the first internal heat exchanger 3 through the first check valve 11, receiver 13 and the third solenoid valve 9 and is evaporated therein, and then the evaporated refrigerant is drawn into compressor 1 through accumulator 14. The remaining part of the refrigerant discharged from compressor 1 flows to the second internal heat exchanger 4 through the first solenoid valve 7 and is condensed therein, and then the condensed refrigerant joins the above-described refrigerant after passing through the second check valve 12. The air drawn into duct 15 by the operation of motor fan 27 appropriately passes through the second internal heat exchanger 4 depending upon the opening degree of air mixing damper 25 after passing through the first internal heat exchanger 3, and thereafter, the air is supplied to the predetermined discharge ports.

In this dry cooling mode, the heat absorbing action of the refrigerant at the first internal heat exchanger 3 and the heat radiating action at the second internal heat exchanger 4 are both performed, and the dehumidification of the interior of the vehicle can be accomplished without an accompanying drop in the temperature of the discharge air by utilizing the both actions. In the operation of this dry cooling mode, as aforementioned, the opening degree "DAR" of air mixing damper 25 is controlled based on the ratio of the air temperature "MIX·S" detected at the output-side position of the second internal heat exchanger 4 to the target discharge temperature "TAO", and the output of compressor 1 is controlled so that the air temperature detected at the output-side position of the first internal heat exchanger 3 is maintained to a predetermined dehumidification temperature (a temperature in a low temperature range which is decided depending upon the temperature of the interior of the vehicle, etc.). In a condition where the opening degree "DAR" of air mixing damper 25 is near 0%, external heat exchanger 2 radiates an excess heat, thereby maintaining a proper balance between the heat absorbing action and the heat radiating action.

Figure 8:
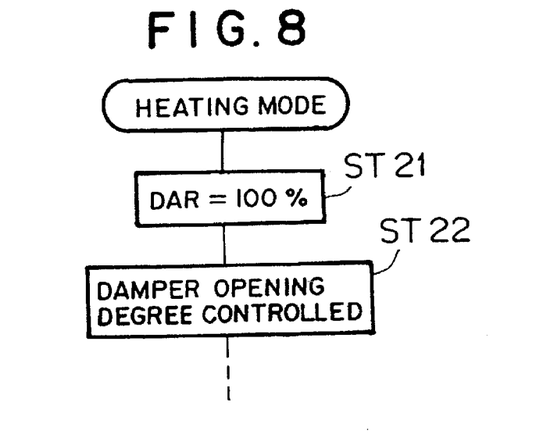
FIG. 8 is a flowchart showing the control of the opening degree of the air mixing damper during a heating-operation mode.

When the mode is determined to be a heating mode, as shown in FIG. 8, the opening degree DAR is set to 100% (step ST21). A signal corresponding the opening degree is sent to AM motor driving circuit 43 and the opening degree "DAR" of air mixing damper 25 is controlled to 100% (step ST22).

Figure 9:
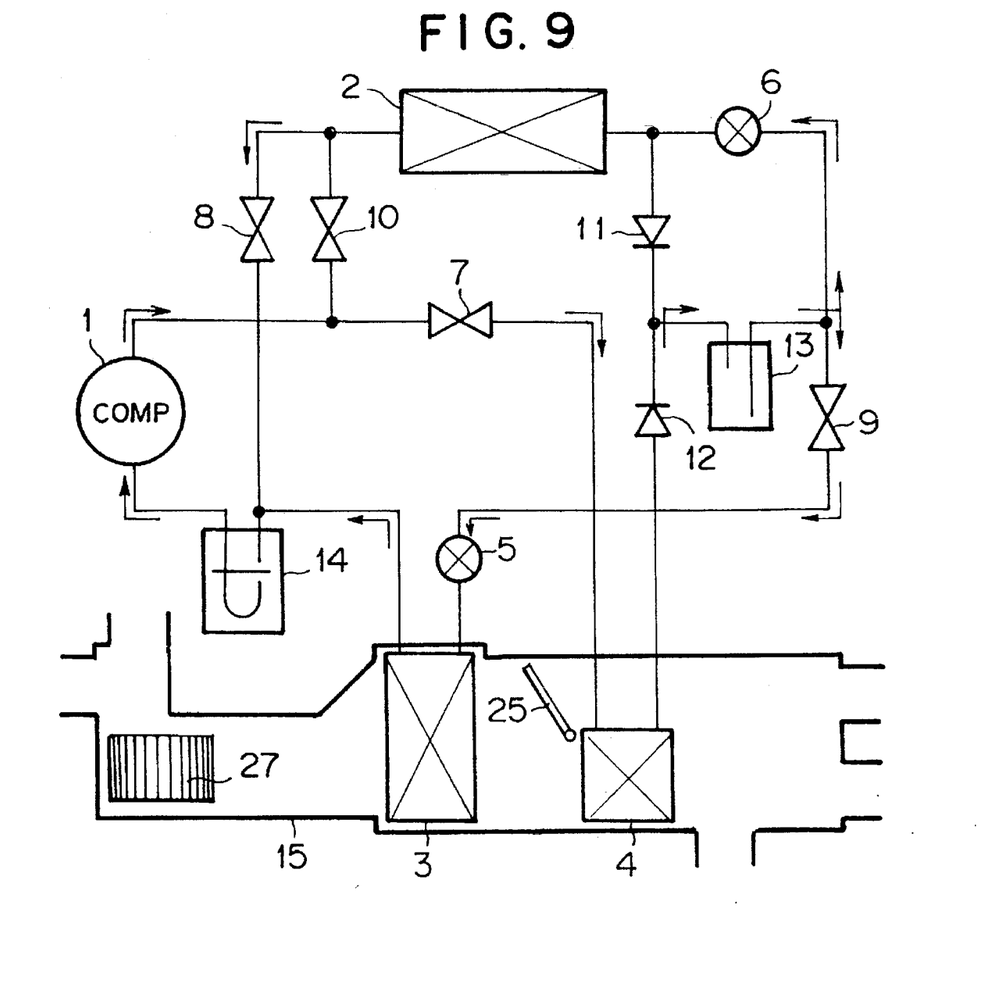
FIG. 9 is a schematic diagram of a refrigerant circuit during the heating-operation mode of the air conditioner shown in FIG. 1.

In this operation of the heating mode, as shown in FIG. 9, the first, second and third solenoid valves 7, 8 and 9 are opened and the fourth solenoid valve 10 is closed, and in such a condition, compressor 1 and motor fan 27 are driven. The refrigerant discharged from compressor 1 flows to the second internal heat exchanger 4 through the first solenoid valve 7 and is condensed therein. The condensed refrigerant is diverged after passing through the second check valve 12 and receiver 13, and one portion of the diverged refrigerant flows to the first expansion valve 5 and the first internal heat exchanger 3 through the third solenoid valve 9 and is evaporated therein, and then the evaporated refrigerant is drawn into compressor 1 through accumulator 14. The other portion of the diverged refrigerant flows to the second expansion valve 6 and external heat exchanger 2 and is evaporated therein, and then the evaporated refrigerant joins the above-described refrigerant at the inlet portion of accumulator 14 after passing through the second solenoid valve 8. The air drawn into duct 15 by the operation of motor fan 27 passes through the first internal heat exchanger 3 and the second internal heat exchanger 4 in that order, and thereafter, the air is supplied to the predetermined discharge ports.

In this heating mode, the interior of the vehicle can be heated utilizing the heat radiating action of the refrigerant by the second internal heat exchanger 4, and the interior of the vehicle can be dehumidified by enabling external heat exchanger 2 and the first internal heat exchanger 3 to perform heat absorbing action and utilizing the heat absorbing action of the first internal heat exchanger 3. In the operation of this heating mode, the output of compressor 1 is controlled so that the air temperature "MIX·S" detected at the output-side position of the second internal heat exchanger 4 becomes the target temperature "TAO" of discharge air as aforementioned.

Figure 10:
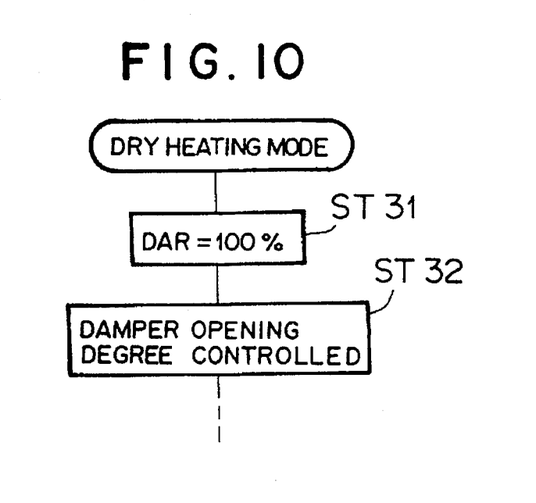
FIG. 10 is a flowchart showing the control of the opening degree of the air mixing damper during a dry heating-operation mode.

When the mode is determined to be a dry heating mode, as shown in FIG. 10, the opening degree DAR is set to 100% (step ST31). A signal corresponding the opening degree is sent to AM motor driving circuit 43 and the opening degree of air mixing damper 25 is controlled to 100% (step ST32).

Figure 11:
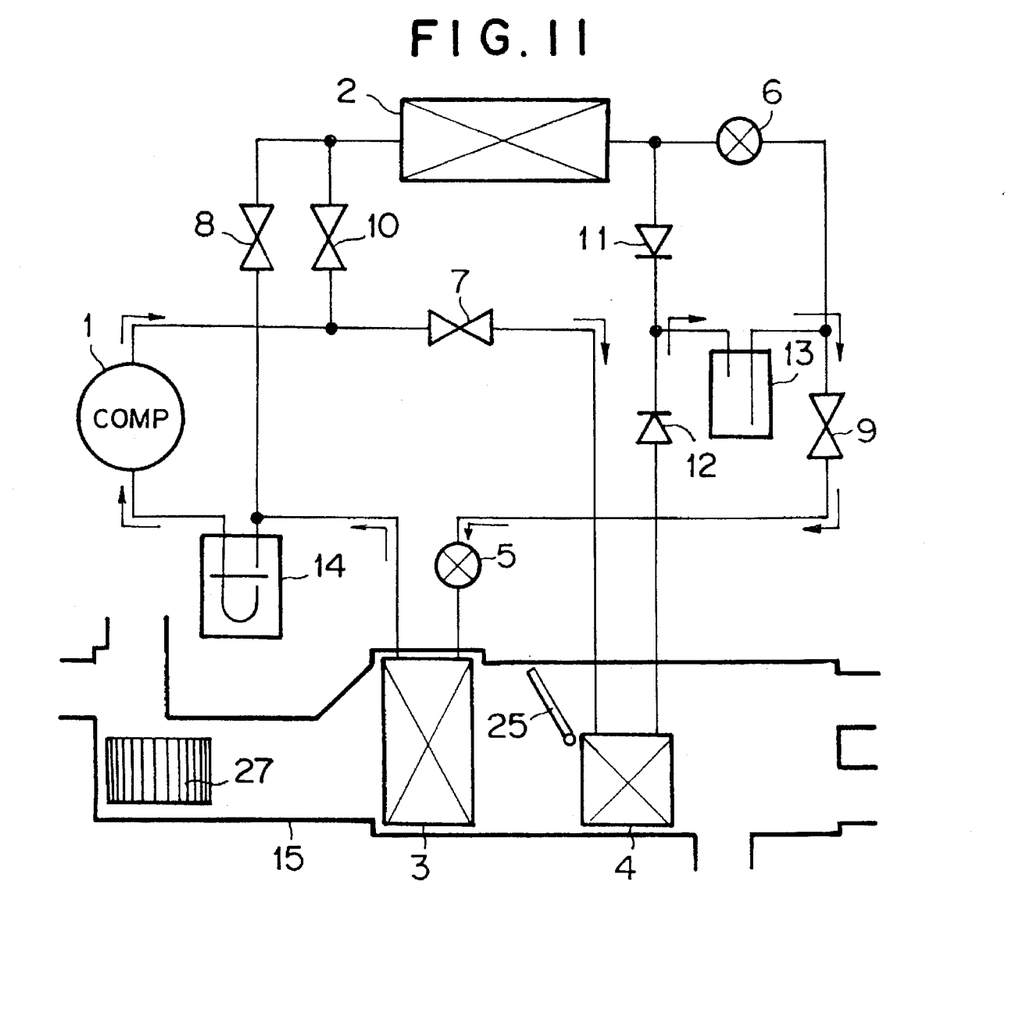
FIG. 11 is a schematic diagram of a refrigerant circuit during the dry heating-operation mode of the air conditioner shown in FIG. 1.

In this operation of the dry heating mode, as shown in FIG. 11, the first and third solenoid valves 7 and 9 are opened and the second and fourth solenoid valves 8 and 10 are closed, and in such a condition, compressor 1 and motor fan 27 are driven. The refrigerant discharged from compressor 1 flows to the second internal heat exchanger 4 through the first solenoid valve 7 and is condensed therein. The condensed refrigerant flows to the first expansion valve 5 and the first internal heat exchanger 3 through the second check valve 12, receiver 13 and the third solenoid valve 9 and is evaporated therein, and then the evaporated refrigerant is drawn into compressor 1 through accumulator 14. The air drawn into duct 15 by the operation of motor fan 27 passes through the first internal heat exchanger 3 and the second internal heat exchanger 4 in that order, and thereafter, the air is sent to the predetermined discharge ports.

In this dry heating mode, the interior of the vehicle can be heated utilizing the heat radiating action of the refrigerant performed by the second internal heat exchanger 4, and the interior of the vehicle can be dehumidified utilizing the heat absorbing action of the refrigerant performed by the first internal heat exchanger 3. In the operation of this dry heating mode, the output of compressor 1 is controlled so that the air temperature "MIX·S" detected at the output-side position of the second internal heat exchanger 4 becomes the target temperature "TAO" of discharge air as aforementioned.

Thus, in the air conditioner of the above-described embodiment, since the heat absorbing action due to the first internal heat exchanger 3 is appropriately performed in the operation of the cooling mode, the heat radiating action mainly due to the second internal heat exchanger 4 is appropriately performed in the operation of the heating mode and both the heat absorbing action due to the first internal heat exchanger 3 and the heat radiating action due to the second internal heat exchanger 4 are appropriately performed in the operations of the dry cooling mode and the dry heating mode, unnecessary heat absorbing action and heat radiating action due to the first internal heat exchanger 3 and the second internal heat exchanger 4 can be prevented, thereby preventing a waste of heat absorbing and heat radiating energy and realizing the desired operation with a saving of energy.

In the operation of the cooling mode, because the volume of the air passing through the second internal heat exchanger 4, which is not used for heat exchange, is controlled to a minimum value (the degree of opening of air mixing damper 25: 0%), even when the operation mode is switched from heating mode or dry heating mode to the cooling mode, the residual heat remaining in the second internal heat exchanger 4 can be prevented from being released, and deterioration of the cooling effect by the residual heat is minimized. Moreover, since the output of compressor 1 is controlled so that the air temperature detected at the output-side position of the first internal heat exchanger 3 becomes the target temperature "TAO" of discharge air in this mode, by adjustment of the heat absorbing ability of the first internal heat exchanger 3 based on the control of the compressor output, the desired cooling operation can be performed with a saving of energy and a high efficiency as well as the temperature of the air discharged from air duct 15 into the interior of the vehicle can be controlled properly and adequately.

Further, in the operations of the heating mode and the dry heating mode, because the volume of the air passing through the second internal heat exchanger 4, which mainly exchanges heat, is controlled to a maximum value (the degree of opening of air mixing damper 25: 100%) and the output of compressor 1 is controlled so that the air temperature "MIX·S" detected at the output-side position of the second internal heat exchanger 4 becomes the target temperature of discharge air "TAO", by performing only a required heat radiation at the second internal heat exchanger 4 by the control of the compressor output, the desired heating operation and dry heating operation can be performed with a saving of energy and a high efficiency while the temperature of the air discharged from air duct 15 into the interior of the vehicle can be controlled properly and adequately.

Furthermore, in the operation of the dry cooling mode, because the degree DAR of opening of air mixing damper 25 is controlled based on the ratio of the air temperature "MIX. S" detected at the output-side position of the second internal heat exchanger 4 to the target discharge temperature "TAO", that is, the volume of the air passing through the second internal heat exchanger 4 is decided based on that temperature ratio, the control of the volume of the air passing through the second internal heat exchanger 4 relative to the target discharge temperature "TAO" can be appropriately performed, thereby controlling the temperature of the air discharged from air duct 15 into the interior of the vehicle properly and adequately. Moreover, in the operation of this mode, because the output of compressor 1 is controlled so that the air temperature detected at the output-side position of the first internal heat exchanger 3 becomes the target temperature of discharge air "TAO", the amount of dehumidification can be properly controlled by adjustment of the heat absorbing ability of the first internal heat exchanger 3.

The present invention is not particularly restricted to the above-described embodiment, and it can be applied to various air conditioners as long as the air conditioners have a variable displacement type compressor and have a heat sink and a radiator disposed in an air duct.

Although only one preferred embodiment of the present invention has been described in detail herein, the invention is not limited thereto. It will be appreciated by those skilled in the art that various modifications may be made without materially departing from the novel and advantageous teachings of the invention. Accordingly, the embodiment disclosed herein is by way of example only. It is to be understood that the scope of the invention is not to be limited thereby, but is to be determined by the claims which follow.

What is claimed is:

1. An air conditioner for vehicles comprising:
    a refrigerant circuit having a compressor with means for varying the compressor output, a heat sink provided at an upstream position in an air duct for performing a heat absorbing action, a radiator provided at a downstream position in said air duct for performing a heat radiating action, an external heat exchanger positioned on the vehicle separate from said air duct, and valve means for controlling the flow of refrigerant to and from said heat sink, said radiator and said external heat exchanger:
    control means for controlling said valve means to cause said refrigerant circuit to provide a cooling operation utilizing said heat absorbing action by supplying refrigerant from said compressor through said external heat exchanger and then through said heat sink, a heating operation utilizing mainly said heat radiating action by supplying refrigerant from said compressor through said radiator and then through said external heat exchanger, and a dehumidifying operation utilizing both said heat absorbing action and said heat radiating action by supplying refrigerant from said compressor through said radiator and then through said heat sink;
    means for detecting air temperatures at output-side positions of said heat sink and said radiator, respectively; and
    means for controlling the output of said compressor in response to at least one of either the air temperature detected at an output-side position of said heat sink of the air temperature detected at an output-side position of said radiator.

2. The air conditioner for vehicles according to claim 1 further comprising means for controlling the volume of air passing through said radiator.

3. The air conditioner for vehicles according to claim 2, wherein said air volume control means is controlled so that said volume of air passing through said radiator becomes a minimum during said cooling operation, and said compressor output control means is controlled so that said air temperature detected at said output-side position of said heat sink is controlled to a target discharge air temperature.

4. The air conditioner for vehicles according to claim 2, wherein said air volume control means is controlled so that said volume of air passing through said radiator becomes a maximum during said heating operation, and said compressor output control means is controlled so that said air temperature detected at said output-side position of said radiator is controlled to a target discharge air temperature.

5. The air conditioner for vehicles according to claim 2, wherein said air volume control means is controlled so that said volume of air passing through said radiator is controlled to an air volume determined based on a ratio of said air temperature detected at said output-side position of said radiator to a target discharge air temperature at the time of said dehumidifying operation, and said compressor output control means is controlled so that said air temperature detected at said output-side position of said heat sink is controlled to a target dehumidification temperature.

6. The air conditioner for vehicles according to claim 2, wherein said air volume control means is an air mixing damper provided immediately upstream of said radiator.

7. An air conditioner for vehicles comprising:
    a refrigerant circuit having a compressor with means for varying an output of the compressor, a refrigerant evaporator provided at an upstream location in an air duct, a refrigerant condenser provided at a downstream location in said air duct, and an external heat exchanger positioned on the vehicle separate from said air duct;
    means for controlling said refrigerant circuit for performing a cooling operation by supplying refrigerant from said compressor through said external heat exchanger and then through said evaporator, a heating operation by supplying refrigerant from said compressor through said condenser and then through said external heat exchanger, and a dehumidifying operation by supplying refrigerant from said compressor through said condenser and then through said evaporator;
    means for detecting an air temperature downstream of said condenser; and
    means for controlling the output of said compressor in response to the air temperature detected at the output-side position of said condenser.

8. The air conditioner for vehicles according to claim 7, further comprising means for controlling the volume of air passing through said condenser.

9. The air conditioner for vehicles according to claim 7, wherein said refrigerant circuit includes valves for controlling the flow of refrigerant among said condenser, evaporator, and external heat exchanger for performing said cooling, heating and dehumidifying operations.

10. An air conditioner for vehicles comprising:

a refrigerant circuit having a compressor with means for varying the compressor output, a heat sink provided at an upstream position in an air duct for performing a heat absorbing action, and a radiator provided at a downstream position in said air duct for performing a heat radiating action, said refrigerant circuit serving to provide a cooling operation utilizing said heat absorbing action, a heating operation utilizing mainly said heat radiating action, and a dehumidifying operation utilizing both said heat absorbing action and said heat radiating action;

means for detecting air temperatures at output-side positions of said heat sink and said radiator, respectively;

means for controlling the output of said compressor in response to at least one of either the air temperature detected at an output-side position of said heat sink or the air temperature detected at an output-side position of said radiator; and means for controlling the volume of air passing through said radiator;

said air volume control means being controlled during said dehumidifying operation so that said volume of air passing through said radiator is controlled to an air volume based on a ratio of said air temperature detected at said output-side position of said radiator to a target discharge air temperature, and said compressor output control means is controlled so that said air temperature detected at said output-side position of said heat sink is controlled to a target dehumidification temperature.

11. The air conditioner for vehicles according to claim 10, wherein said air volume control means is an air mixing damper provided immediately upstream of said radiator.

12. The air conditioner for vehicles according to claim 10, wherein said refrigerant circuit includes an external heat exchanger, and valves for controlling the flow of refrigerant among said heat sink, radiator and external heat exchanger for performing said cooling, heating and dehumidifying operations.

* * * * *